US005184967A

United States Patent [19]

Onoue et al.

[11] Patent Number: 5,184,967

[45] Date of Patent: Feb. 9, 1993

[54] THRUST FLANGE LUBRICATING STRUCTURE OF MARINE PROPULSION UNIT

[75] Inventors: Akihiro Onoue; Ryoji Nakahama, both of Hamamatsu, Japan

[73] Assignee: Sanshin Kogyo Kabushiki Kaisha, Hamamatsu, Japan

[21] Appl. No.: 727,831

[22] Filed: Jul. 9, 1991

[30] Foreign Application Priority Data

May 17, 1990 [JP] Japan .................................. 2-125402

[51] Int. Cl.[5] .............................................. B63H 21/28

[52] U.S. Cl. ........................................ 440/75; 184/6.12

[58] Field of Search ............................. 440/75, 83, 88; 184/6.12; 192/21, 51; 74/378

[56] References Cited

U.S. PATENT DOCUMENTS 4,764,135 8/1988 McCormick ............................ 440/83
4,986,775 1/1991 Wantz .................................... 440/83

FOREIGN PATENT DOCUMENTS 61-175346 8/1986 Japan .
2-185888 7/1990 Japan .

*Primary Examiner*—Sherman Basinger
*Attorney, Agent, or Firm*—Ernest A. Buetler

[57] ABSTRACT

A lower unit assembly for a marine outboard drive having a forward, neutral, reverse transmission positioned forwardly of a thrust flange on the propeller shaft and for driving the propeller shaft in forward and reverse directions. Several embodiments of arrangements are shown for lubricating not only the thrust flange, but the thrust bearings which it engages by circulating lubricant from the transmission rearwardly of the thrust flange.

20 Claims, 4 Drawing Sheets

28 13 31 26 59 47 48 32 57 29 58 56 65 66 52 51 54 55 15 14 53 16 11 46 49 68 44 61 71 27 41 69 45 43 39 42 64 38 35 62 33 36 67 37 34 63

11
16
14
53
55
54
15
52
51
69
71
66
65
56
58
57
59
64
62
151
63
34
39
37
42
35
67
28
32
36
41
67
43
38
33
49
47
46
26
27
45
29

THRUST FLANGE LUBRICATING STRUCTURE OF MARINE PROPULSION UNIT

BACKGROUND OF THE INVENTION

This invention relates to a thrust flange lubricating structure of a marine propulsion unit and more particularly to an improved arrangement for lubricating the thrust taking arrangement of the lower unit of a marine outboard drive.

As is well known, many forms of marine outboard drives employ a lower unit having a propeller shaft that is journaled for rotation and which is driven, at the forward end thereof, from a vertically extending drive shaft through a transmission. Frequently, the transmission employed is a bevel gear type of forward, neutral, reverse transmission.

With transmissions of this type, various types of arrangements have been employed for transferring the driving thrust from the propeller shaft to the lower unit housing. One type of thrust taking arrangement employs a thrust flange which is provided on the propeller shaft and which transfers either forward, reverse or both forward and reverse driving thrusts to the lower unit housing through appropriately positioned and supported thrust bearings.

It is normally the practice to enclose the transmission of the lower unit which drives the propeller shaft in a closed chamber that is filled with lubricant for lubricating the transmission gears. Frequently these transmissions employ some form of pumping arrangement for circulating the lubricant around the various components to be lubricated. However, the thrust flange on the propeller shaft forms an inherent dam which will block the lubricant from flowing rearwardly to lubricate the thrust bearings that engage the thrust flange and also any bearings which may support the aft end of the propeller shaft. This can give rise to obvious problems.

It is, therefore, a principal object of this invention to provide an improved arrangement for lubricating the components of the lower unit of a marine outboard drive.

It is a further object of this invention to provide an arrangement for lubricating the thrust bearings associated with the thrust flange of the propeller shaft of a marine outboard drive lower unit.

It is a further object of this invention to provide an improved arrangement that will insure adequate lubrication of all components and bearings in a marine outboard drive lower unit.

SUMMARY OF THE INVENTION

This invention is adapted to be embodied in a lower unit for a marine outboard drive that comprises a lower unit housing. A propeller shaft is journaled for rotation within the lower unit housing and transmission means at the forward end of the lower unit housing drive the propeller shaft. A thrust flange is provided on the propeller shaft rearwardly of the transmission means for transferring driving thrust in at least one direction between the propeller shaft and the lower unit housing. A gear lubricant cavity is formed forwardly of the thrust bearing around the transmission means. Means are provided for delivering lubricant from the gear lubricant cavity to a point rearward of the thrust flange and in proximity thereto.

DETAILED DESCRIPTION OF THE PREFERRED EMBODIMENTS

Figure 1:
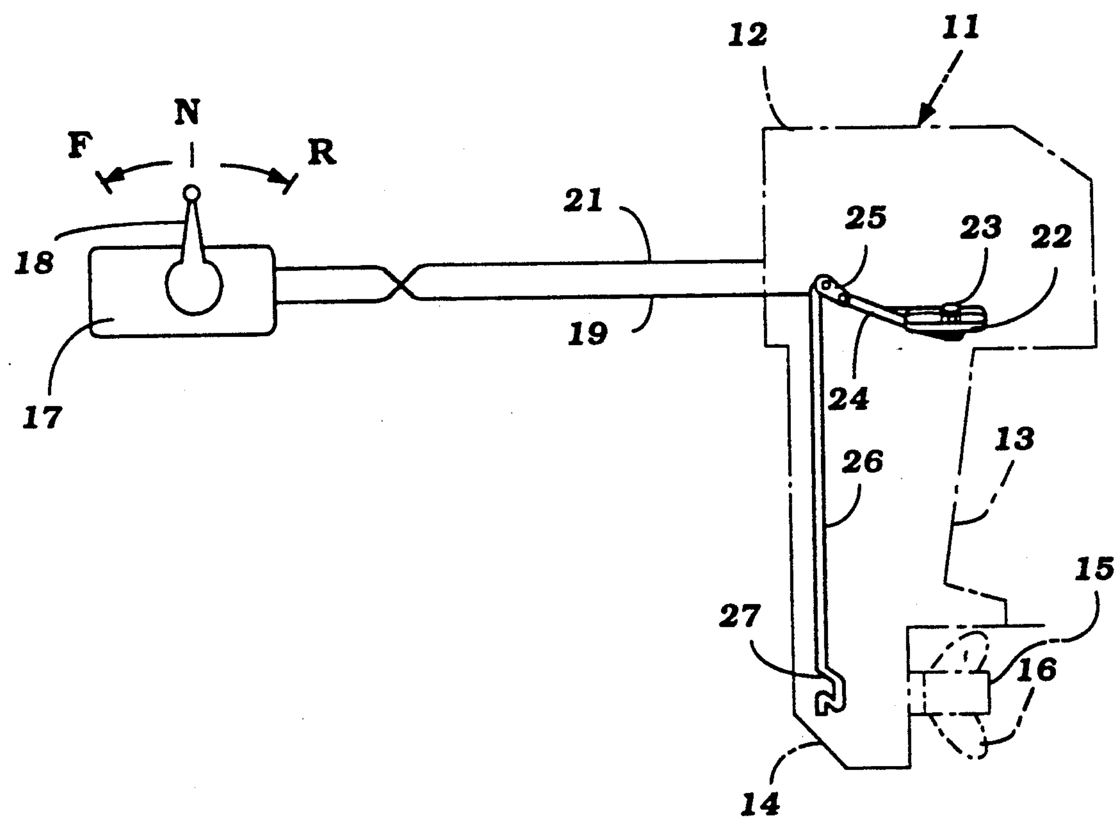
FIG. 1 is a partially schematic side elevational view showing the transmission control for an outboard motor and a portion of the outboard motor in phantom.

Referring first in detail to the drawings, the reference numeral 11 indicates a marine outboard drive, which in the illustrated embodiment, is an outboard motor. Although the described embodiment is that of an outboard motor, it is to be understood that the invention can be equally as well practiced in other types of marine outboard drives such as the outboard drive portion of an inboard/outboard drive. Since the invention has particular utility in conjunction with the lower unit and transmission thereof, the specific construction of the type of marine outboard drive employed is not believed to be necessary to enable those skilled in the art to practice the invention.

The outboard motor 11 includes a power head 12 that contains an internal combustion engine and which is surrounded by a surrounding protective cowling. The engine, as is typical with outboard motor practice, drives an output shaft that rotates about a vertically extending axis and which is coupled to a drive shaft (not shown in this figure) which is rotatably journaled in a drive shaft housing 13 that depends from the power head. A lower unit 14 is carried at the lower portion of the drive shaft housing 13 and contains a transmission (also not shown in this figure) which is adapted to drive a propeller shaft 15 and attached propeller 16 in selected forward and reverse directions.

A remotely positioned single control lever actuator 17 is positioned forwardly in the hull of the associated watercraft and has a control lever 18 that is movable between a neutral position, as shown in this figure, and forward and reverse positions as shown by the arrows and legend in this figure.

The control lever 18 is connected to a pair of bowden wire cables, a cable 19 for shift control and a cable 21 for throttle control, which extend rearwardly. The cable 19 is connected to a cam member 22 having a slot in which a follower pin 23 is received. The follower pin 23 is carried at one end of a shift lever 24 which is, in turn, connected by means of a link or lever 25 to a shift rod 26. The shift rod 26 has a lower crank portion 27 that cooperates with the transmission control of the lower unit 14 in a manner which will now be described by particular reference to the remaining figures.

Figure 2:
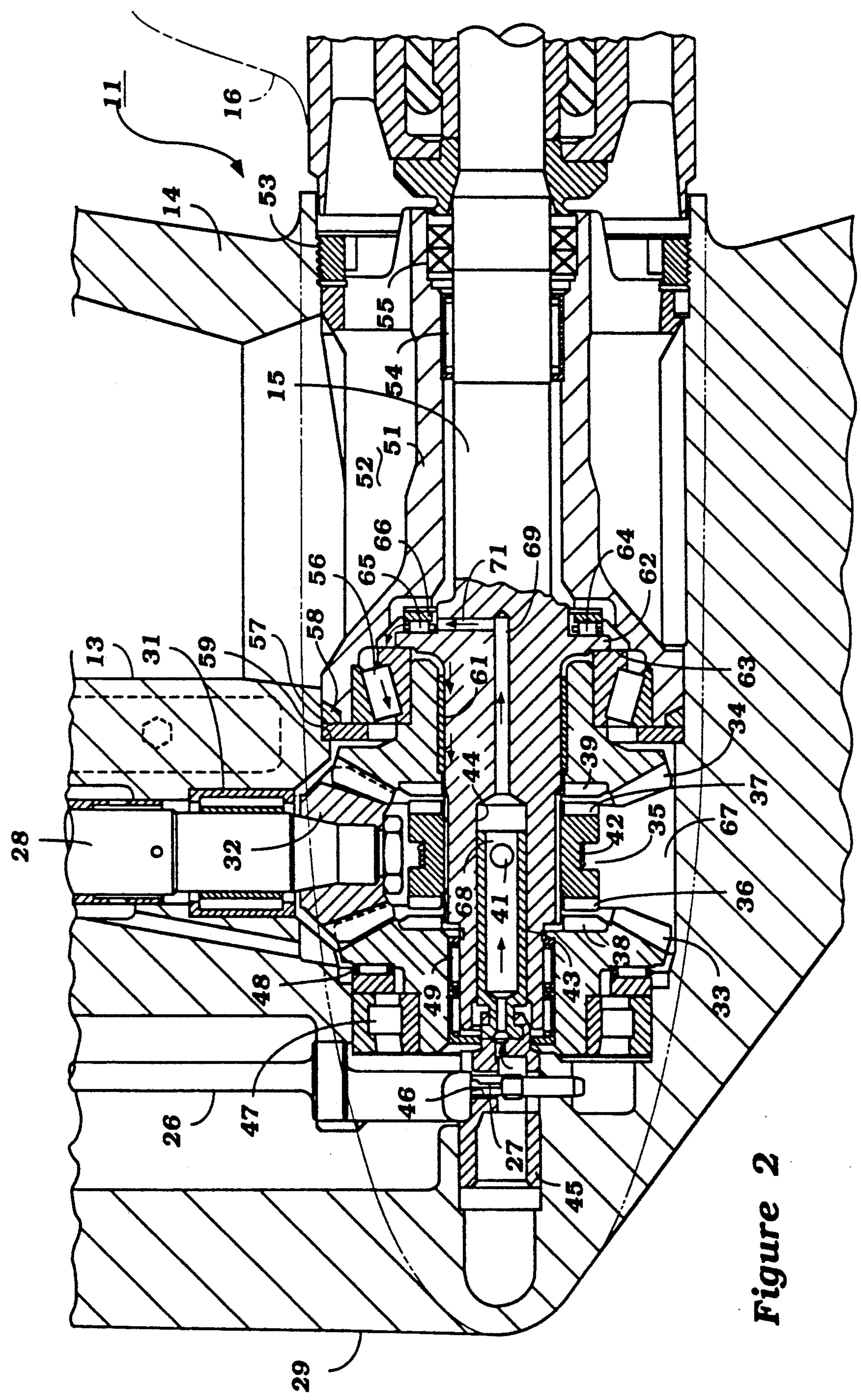
FIG. 2 is an enlarged cross sectional view taken through the lower unit of the outboard motor.

Referring first to FIG. 2, the aforementioned drive shaft is shown in this figure and is identified by the reference numeral 28. The lower end of the drive shaft 28 is journaled within the lower unit 14 and specifically an outer housing 29 thereof by means of an anti friction bearing 31.

Affixed to the lower end of the drive shaft 28 is a bevel gear 32 which is held in place in a well known manner and which meshes with a pair of counter rotating bevel gears 33 and 34 which are journaled, in a manner to be described, on the propeller shaft 15. Because of their diametrically opposed meshing relationship with the driving bevel gear 32, the driven bevel gears 33 will rotate in opposite directions, as is well known in this art.

A dog clutching sleeve, indicated generally by the reference numeral 35 is provided between the bevel gears 33 and 34 and has a splined connection to a forward portion of the propeller shaft 15. This dog clutching sleeve 35 has oppositely facing do clutching teeth 36 and 37 which face corresponding do clutching teeth 38 and 39 formed on the facing surfaces of the bevel gears 33 and 34, respectively. A pin 41 is received within a groove in the dog clutching sleeve 35 and is held in place by means of a torsional spring 42. The pin 41 extends through an elongated slot (not shown) in the propeller drive shaft 15 and affords a connection between the dog clutching sleeve 35 and a shift plunger 43. The shift plunger 43 is slidably supported within a bore 44 formed in the front portion of the propeller shaft 15.

The shift plunger 43 has a connection to a shift cam 45 which permits rotary motion of the shift plunger 43 while transferring axial movement of the shift cam 45 into axial movement of the shift plunger 43. The shift cam 45 has a cam slot 46 that receives the eccentric surface 27 of the shift rod 26. As a result, rotation of the shift rod 26 will effect movement of the shift cam 45 in an axial direction so as to shift the shift plunger 43 and dog clutching sleeve 35 in selected forward and reverse directions. This will effect engagement between the dog clutching teeth 36, 38 or 37, 39 so as to drive the propeller shaft 15 in selected forward or reverse directions.

The forwardmost bevel gear 33 has a hub portion that is rotatably journaled within the lower unit housing 29 by means of an anti friction bearing 47. In addition, a thrust bearing 48 is interposed between the bearing 47 and the forward side of the bevel gear 43 so as to transmit axial thrust from the driving of the bevel gear 33 to the lower unit housing 29 through the bearing 47. No driving thrusts from the propeller shaft 15 are, however, transmitted through this driving connection.

The bevel gear 33 has an internal needle type bearing 49 that journals the forward end of the propeller shaft 15.

At the rear end of the lower unit housing 29, there is positioned a bearing carrier, indicated generally by the reference numeral 51 which is received within a rearwardly opening cavity 52 formed in the lower unit housing 29 and is held axially in place by a retaining ring 53. The bearing carrier 51 carries, at its rearward end, an anti friction needle type bearing 54 that journals the rear end of the propeller shaft 15 adjacent its connection to the propeller 16. An oil and waterseal 55 is carried within the bearing carrier 51 rearwardly of the bearing 54.

At its forward end, the bearing carrier 51 carries a thrust type anti friction bearing 56 which is received around the hub of the rearwardmost driven bevel gear 34 and which serves to rotatably journal it within the bearing carrier 51. The bearing carrier 51 also is either engaged with or fixed to a thrust plate 57 with a seal 58 positioned therebetween. The forward end of the thrust plate 57 is engaged with a shoulder 59 formed in the lower unit housing.

An anti friction bushing 61 is provided between the inner end of the hub of the rearward driven bevel gear 34 and the propeller shaft 15 for journaling it.

Positioned in engagement with the inner race of the thrust bearing 56 is a thrust flange 62 that is either fixed on or formed integrally with the propeller shaft 15 rearwardly of the driven bevel gear 34. This thrust flange has a forwardly facing thrust surface 63 that engages the inner race of the thrust bearing 56 so as to transfer forward driving thrust from the propeller 15 through the thrust bearing 56 and thrust ring 57 to the lower unit housing 29. In this embodiment, the gear 33 is the forward drive gear and hence is coupled to the propeller shaft 15 for rotating it in the forward drive position, which is in a clock wise direction when viewed from the rear of the propeller shaft 15. Hence, the gear 34 will rotate in an opposite direction relative to the propeller shaft. However, under this condition there is not a large load on the thrust bearing 56 due to the opposite rotation since the gear 34 is not transferring any power to the propeller shaft 15.

Rearward driving thrusts are transmitted to the bearing carrier 51 and lower unit housing 29 from a rearwardly facing thrust shoulder 64 of the thrust flange 62 and which is engaged with a needle type thrust bearing 65 having a race 66 that is engaged with a shoulder of the bearing carrier 51. It should be noted that there is a clearance between the thrust shoulder 63 and 64 and the respective bearings 56 and 65 so that during forward driving thrusts there will be a clearance between the thrust flange 64 and the bearing 65. Although there will normally be no clearance between the thrust flange 63 and the inner race of the thrust bearing 56, even during forward driving thrust the load will fluctuate due to the irregular firing of the engine and the firing impulses are transmitted to the drive shaft 28. Hence, during each revolution there will be some clearances develop even between the thrust flange surface 63 and the inner race of the thrust bearing 56 even during forward driving forces.

The area of the lower unit housing 29 forwardly of the thrust flange 62 is provided with a cavity 67 which is filled with lubricant for lubricating the bevel gears 32, 33 and 34 and the bearings contained within this cavity. If desired, some form of mechanism may be employed for pumping this lubricant to lubricate the bearing 31 and other upper bearings of the drive shaft 28, as is well known in this art.

The structure as thus far described may be considered to be conventional. However, with these conventional structures, the thrust flange 62 tends to isolate the lubricant in the cavity 67 from the rearward portion of the thrust flange 62 and specifically the thrust bearing 65. Obvious disadvantages can result with such an arrangement.

In accordance with the invention, therefore, there is provided a lubricant path that consists of a counter drilled passageway 68 that extends through the shift plunger 43 and which communicates with a drilled passageway 69 at the base of the bore 44. A radially extending passageway 71 extends outwardly from the drilled passageway 69 in proximity with the thrust bearing 65. As a result of this construction, rotation of the propeller shaft 15 will cause centrifugal force on the lubricant in the chamber 67 to cause it to move axially through the plunger passageway 68, drive shaft passageway 69 and flow radially outwardly across the thrust bearing 65. This lubricant then can escape around the periphery of the thrust flange 62 and also lubricate the forward thrust bearing 56 before return to the cavity 67. As a result, the thrust faces 63 and 64 of the thrust flange 62 will be lubricated as will the thrust bearings 65 and 56. The lubricant will flow through the clearance generated between the thrust face 64 and thrust bearing 65, as aforenoted. This lubricant can also flow and lubricant the forward thrust surface 63 during the periods when the driving impulses are not present and a clearance develops, as aforenoted. Thus, the disadvantages present in the prior art constructions are avoided with this construction.

Figure 3:
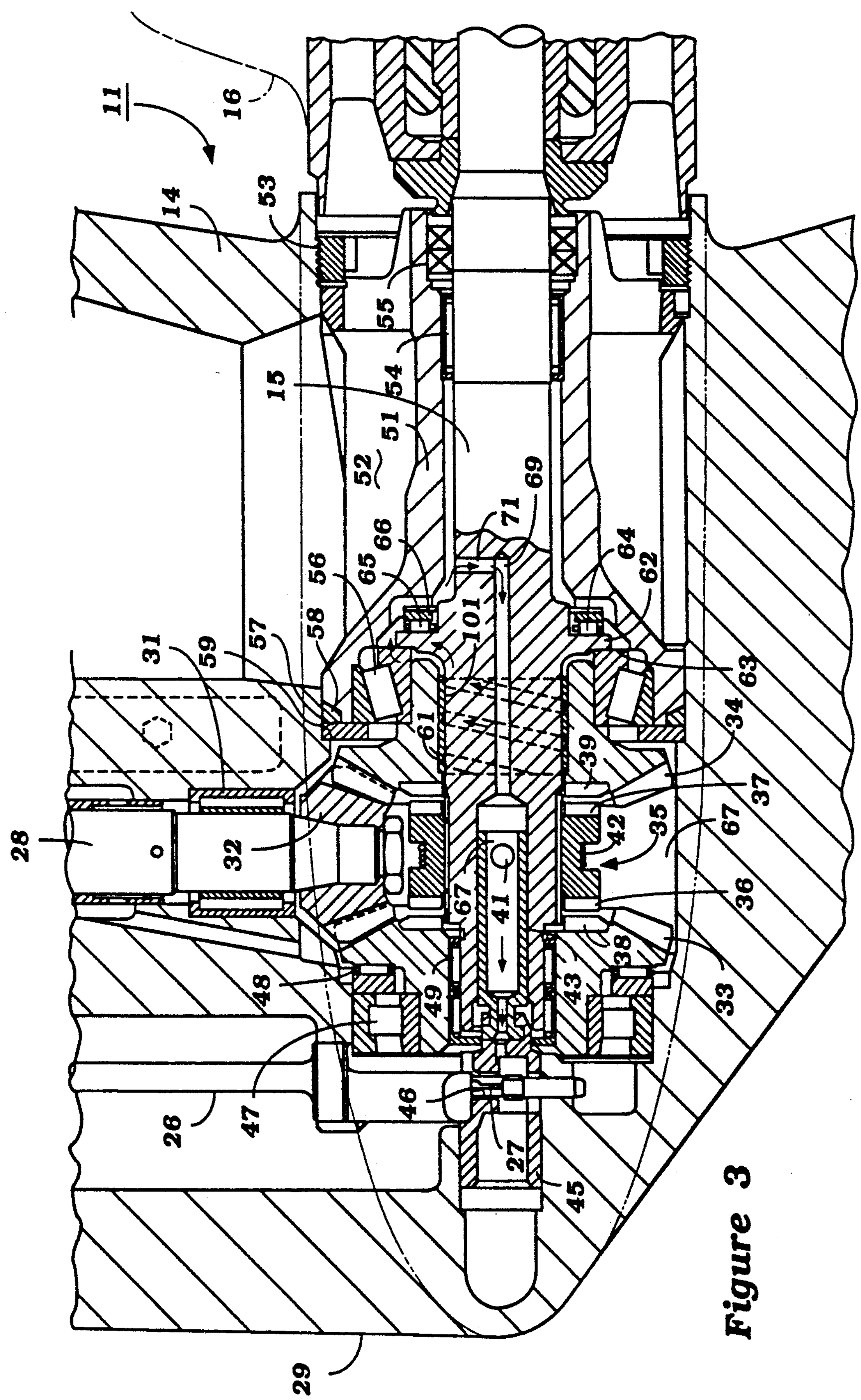
FIG. 3 is a cross sectional view, in part similar to FIG. 2, and shows another embodiment of the invention.

FIG. 3 shows another embodiment of the invention which is generally the same as the embodiment of FIG. 2. For that reason, components of this embodiment which are the same as the previously described embodiment have been identified by the same reference numerals.

In accordance with this embodiment, however, the rear bushing 61 is provided with a helical groove 101 which will pick up lubricant from the lubricant chamber 67 and cause it to move in an axial direction toward the forward thrust shoulder 63 of the thrust flange 62. This lubricant can flow between the thrust surface 63 and the inner race of the thrust bearing 56 during the period when there are not power impulses being transmitted to the propeller shaft by the drive shaft 28 due to the aforenoted firing impulses of the driving engine. This lubricant can then flow across the thrust bearing 56 and around the outer periphery of the rearward thrust bearing 65. This lubricant then returns through the passageways 71, 69 and 68 to the chamber 67. This lubricant can return through the aforenoted clearance which exists during forward driving thrust between the thrust flange surface 64 and the thrust bearing 65. This direction of flow is indicated by the arrows in FIG. 3.

Figure 4:
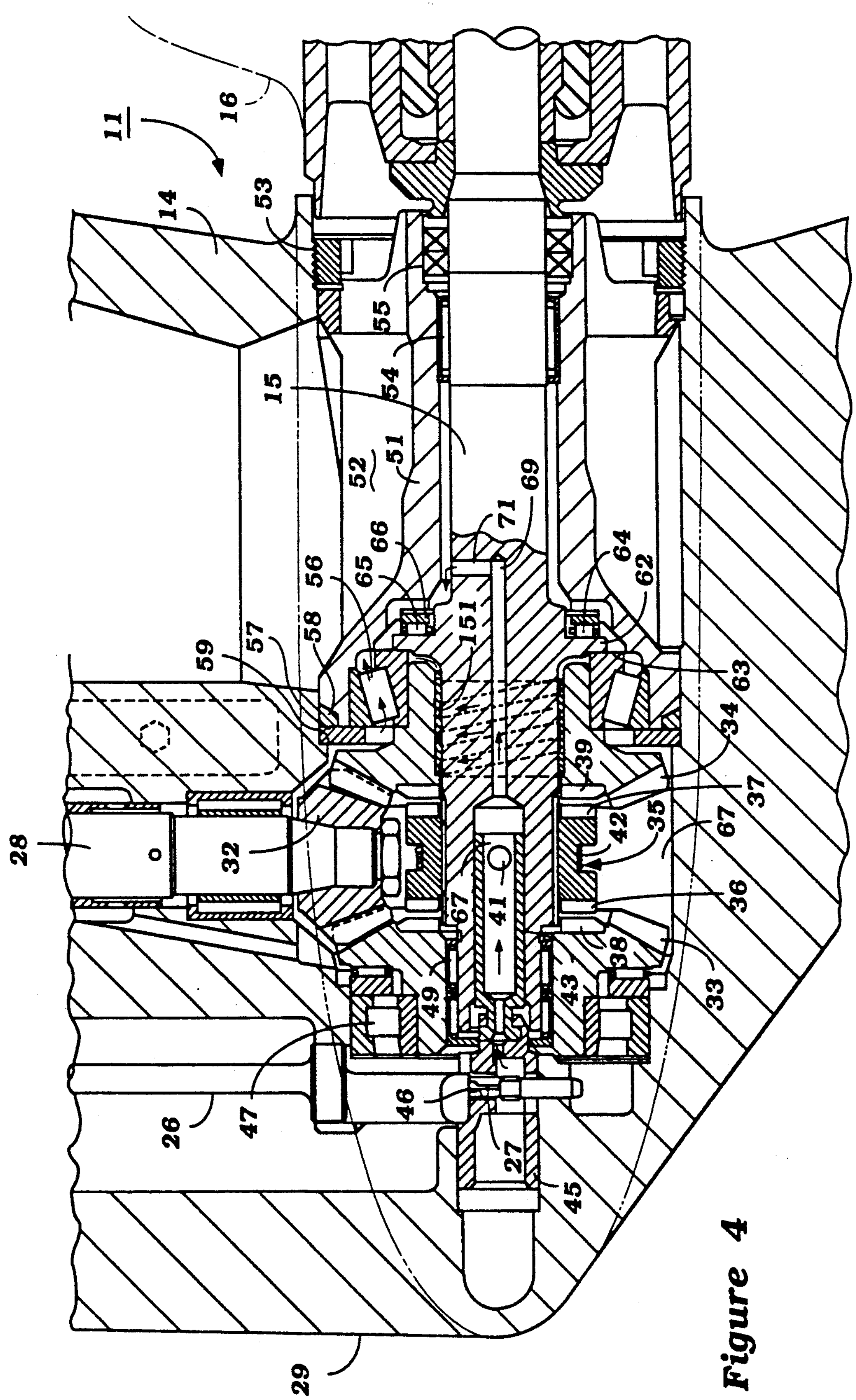
FIG. 4 is a cross sectional view, in part similar to FIGS. 2 and 3, and shows a further embodiment of the invention.

FIG. 4 shows another embodiment of the invention which is generally the same as the embodiment of FIG. 3. In this embodiment, however, the hand of the groove 101 is reversed, as shown at 151. This type of hand is employed when the propeller shaft 15 is driven in a counter clockwise direction in its forward drive mode, as with a counter rotating twin outboard drive arrangement. This is done to insure that the flow of lubricant will take place when the propeller shaft 15 is rotating in an opposite direction from the gear 34 during its driving mode to insure adequate lubrication. It may be seen that the conversion to a counter rotating mechanism is easily done by merely replacing the bushing in which the groove 101 or 151 is formed.

It should be readily apparent from the foregoing descriptions that the described embodiments of the invention are particularly adapted in insuring good lubrication of the thrust surfaces of the thrust flange of the propeller shaft and the associated bearings. Of course, the foregoing description is that of a preferred embodiment of the invention. Various changes and modifications may be made without departing from the spirit and scope of the invention, as defined by the appended claims.

We claim:

1. A lower unit for a marine outboard drive comprising a lower unit housing, a propeller shaft journaled for rotation in said lower unit housing, transmission means at a forward end of said lower unit housing for driving said propeller shaft, a thrust flange on said propeller shaft rearwardly of said transmission means for transferring driving thrusts in at least one direction between said propeller shaft and said lower unit housing, a gear lubricant cavity formed forwardly of said thrust flange, and means including pumping means for circulating lubricant under pressure between said gear lubricant cavity and the rear side of said thrust flange.

2. A lower unit as set forth in claim 1 wherein the pumping means comprises a radially extending passage formed in the propeller shaft rearwardly of the thrust flange for moving lubricant by centrifugal force.

3. A lower unit as set forth in claim 1 wherein the pumping means comprises a helical groove interposed between an exterior surface of the propeller shaft and a supporting bushing.

4. A lower unit as set forth in claim 3 wherein the bushing is positioned forwardly of the thrust flange.

5. A lower unit as set forth in claim 4 wherein the bushing is readily replaceable for replacement with a bushing of an opposite hand for reversing the direction of pumping action.

6. A lower unit as set forth in claim 1 further including a thrust bearing engaged with the rear side of the thrust flange and wherein the means for circulating lubricant circulates lubricant to the thrust bearing.

7. A lower unit as set forth in claim 6 wherein the pumping means comprises a radially extending passage formed in the propeller shaft rearwardly of the thrust flange for moving lubricant by centrifugal force.

8. A lower unit as set forth in claim 6 wherein the pumping means comprises a helical groove interposed between an exterior surface of the propeller shaft and a supporting bushing.

9. A lower unit as set forth in claim 8 wherein the bushing is positioned forwardly of the thrust flange.

10. A lower unit as set forth in claim 9 wherein the bushing is readily replaceable for replacement with a bushing of an opposite hand for reversing the direction of pumping action.

11. A lower unit as set forth in claim 1 wherein the thrust flange has a forwardly facing thrust shoulder engaged with a thrust bearing and wherein the means for calculating lubricant circulates lubricant across said thrust bearing.

12. A lower unit as set forth in claim 11 wherein the pumping means comprises a radially extending passage formed in the propeller shaft rearwardly of the thrust flange for moving lubricant by centrifugal force.

13. A lower unit as set forth in claim 11 wherein the pumping means comprises a helical groove interposed between an exterior surface of the propeller shaft and a supporting bushing.

14. A lower unit as set forth in claim 13 wherein the bushing is positioned forwardly of the thrust flange.

15. A lower unit as set forth in claim 14 wherein the bushing is readily replaceable for replacement with a bushing of an opposite hand for reversing the direction of pumping action.

16. A lower unit as set forth in claim 11 further including a rearward thrust bearing interposed between a rearwardly facing thrust surface of the thrust flange and the lower unit housing for transferring thrust therebetween and wherein the means for circulating lubricant circulates lubricant across both of the thrust bearings.

17. A lower unit as set forth in claim 16 wherein the pumping means comprises a radially extending passage formed in the propeller shaft rearwardly of the thrust flange for moving lubricant by centrifugal force.

18. A lower unit as set forth in claim 16 wherein the pumping means comprises a helical groove interposed between an exterior surface of the propeller shaft and a supporting bushing.

19. A lower unit as set forth in claim 18 wherein the bushing is positioned forwardly of the thrust flange.

20. A lower unit as set forth in claim 19 wherein the bushing is readily replaceable for replacement with a bushing of an opposite hand for reversing the direction of pumping action.

* * * * *